(12) United States Patent
Fleck et al.

(10) Patent No.: US 9,975,647 B2
(45) Date of Patent: May 22, 2018

(54) FLIGHT DECK DOOR SURVEILLANCE AND LOCK CONTROL

(71) Applicant: Rosemount Aerospace Inc., Burnsville, MN (US)

(72) Inventors: Travis W. Fleck, Farmington, MN (US); Adam Leppert, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 44 days.

(21) Appl. No.: 14/825,230

(22) Filed: Aug. 13, 2015

(65) Prior Publication Data

US 2017/0043881 A1 Feb. 16, 2017

(51) Int. Cl.
| | | |
|---|---|---|
| *B64D 45/00* | (2006.01) | |
| *B64C 1/14* | (2006.01) | |
| *G07C 9/00* | (2006.01) | |

(52) U.S. Cl.
CPC ........ *B64D 45/0015* (2013.01); *B64C 1/1469* (2013.01); *G07C 9/00563* (2013.01); *B64D 2045/0035* (2013.01)

(58) Field of Classification Search
CPC ........ B64D 45/0015; B64D 2045/0055; B64D 2045/004; B64D 2045/0045; B64D 2045/0035; G07C 9/00182; G07C 9/00309; G07C 9/00563; B64C 1/1469; G05D 1/0055; G08B 31/00
USPC .............. 701/45, 2–3, 11–14; 340/945, 5.64; 244/101, 105, 118.5, 129.5
See application file for complete search history.

(56) References Cited

U.S. PATENT DOCUMENTS

| | | | |
|---|---|---|---|
| 6,072,402 A | 6/2000 | Kniffin et al. | |
| 6,246,320 B1 * | 6/2001 | Monroe | B64D 45/0015 340/506 |
| 6,766,983 B2 | 7/2004 | D'Alvia | |
| 6,793,179 B2 | 9/2004 | Daniels | |
| 6,830,217 B2 | 12/2004 | Movsesian et al. | |
| 6,915,986 B2 * | 7/2005 | D'Alvia | B64C 1/1469 244/118.5 |
| 7,443,281 B2 | 10/2008 | Gudmundsson | |

(Continued)

OTHER PUBLICATIONS

Extended European Search Report, for European Patent Application No. 16183763.8, dated Jan. 4, 2017, 7 pages.

*Primary Examiner* — Nga X Nguyen
(74) *Attorney, Agent, or Firm* — Kinney & Lange, P.A.

(57) ABSTRACT

In one example, a method includes capturing, by a camera system including at least one camera device positioned within an aircraft, image data of an interior of the aircraft. The method further includes determining, by a processing device positioned within the aircraft, that one or more alert criteria are satisfied, and outputting, in response to determining that the one or more alert criteria are satisfied, at least a portion of the captured image for transmission to a ground-based computing device via a wireless communications network. The method further includes receiving, from the ground-based computing device, a lock override command configured to cause the processing device to unlock an electronically-controlled door lock of a flight deck door of the aircraft, and responsively unlocking the electronically-controlled door lock of the flight deck door.

17 Claims, 2 Drawing Sheets

(56) References Cited

U.S. PATENT DOCUMENTS

| | | | | |
|---|---|---|---|---|
| 2003/0071743 A1* | 4/2003 | Seah | .................... | B64C 1/1469 340/945 |
| 2005/0082429 A1* | 4/2005 | D'Alvia | ............... | B64C 1/1469 244/118.5 |
| 2005/0218266 A1* | 10/2005 | Bandy | .................. | B64C 1/1469 244/118.5 |

* cited by examiner

FLIGHT DECK DOOR SURVEILLANCE AND LOCK CONTROL

BACKGROUND

The present disclosure relates generally to surveillance systems, and more particularly to surveillance systems used to facilitate control of a lock of a flight deck door of an aircraft.

To help ensure the safety of aircraft crew and passengers, access to the flight deck of a commercial transport aircraft is typically controlled via a locking mechanism of a flight deck door that separates the flight deck from the cabin of the aircraft. In this way, a flight crew of the aircraft (e.g., pilot(s), copilot(s), or other flight crew members) can secure themselves within the flight deck of the aircraft during flight, thereby preventing access to flight controls and other instrumentation by unauthorized personnel.

In many cases, actuation of the locking mechanism to the flight deck door is electronically controlled via a switch or other interface located within the flight deck and facilitated by a camera system mounted within the cabin of the aircraft outside the flight deck door. For instance, access to the flight deck during flight can typically be requested via an entry request button or other notification system located within the cabin area outside the flight deck door. A pilot, copilot, or other flight crew member within the flight deck, upon notification of the access request, can view video data captured by the camera system to verify whether the requesting party is authorized for access. Authorized personnel can be admitted to the flight deck by unlocking the flight deck door from within the flight deck.

In some cases, an alphanumeric keypad or other interface is located within the cabin area outside the flight deck door to enable unlocking of the flight deck door via a passcode, typically known only by authorized personnel, and often modified between flights. However, to help mitigate a possible risk that the passcode has become known to unauthorized persons, the lock control interface within the flight deck (e.g., a toggle switch) may sometimes include an override control mechanism, enabling flight crew within the flight deck to override the passcode interface and prevent all access to the flight deck through the locked flight deck door. As such, in many cases, ultimate authority of the flight deck door lock and the corresponding access to the flight deck is controlled via an interface located within the flight deck of the aircraft.

SUMMARY

In one example, a method includes capturing, by a camera system including at least one camera device positioned within an aircraft, image data of an interior of the aircraft. The method further includes determining, by a processing device positioned within the aircraft, that one or more alert criteria are satisfied, and outputting, by the processing device in response to determining that the one or more alert criteria are satisfied, at least a portion of the captured image data of the interior of the aircraft for transmission to a ground-based computing device via a wireless communications network. The method further includes receiving, by the processing device from the ground-based computing device via the wireless communications network, a lock override command configured to cause the processing device to unlock an electronically-controlled door lock of a flight deck door of the aircraft, and unlocking, by the processing device in response to receiving the lock override command from the ground-based computing device, the electronically-controlled door lock of the flight deck door.

In another example, a system includes a camera system including at least one camera device and a processing device positioned within an aircraft. The camera system is configured to capture image data of an interior of the aircraft. The processing device comprises at least one processor and one or more storage devices. The one or more storage devices are encoded with instructions that, when executed by the at least one processor, cause the processing device to determine that one or more alert criteria are satisfied, and output, in response to determining that the one or more alert criteria are satisfied, at least a portion of image data of the interior of the aircraft captured by the camera system for transmission to a ground-based computing device via a wireless communications network. The one or more storage devices are further encoded with instructions that, when executed by the at least one processor, cause the processing device to receive, from the ground-based computing device via the wireless communications network, a lock override command configured to cause the processing device to unlock an electronically-controlled door lock of a flight deck door of the aircraft, and unlock, in response to receiving the lock override command from the ground-based computing device, the electronically-controlled door lock of the flight deck door.

DETAILED DESCRIPTION

Figure 1:
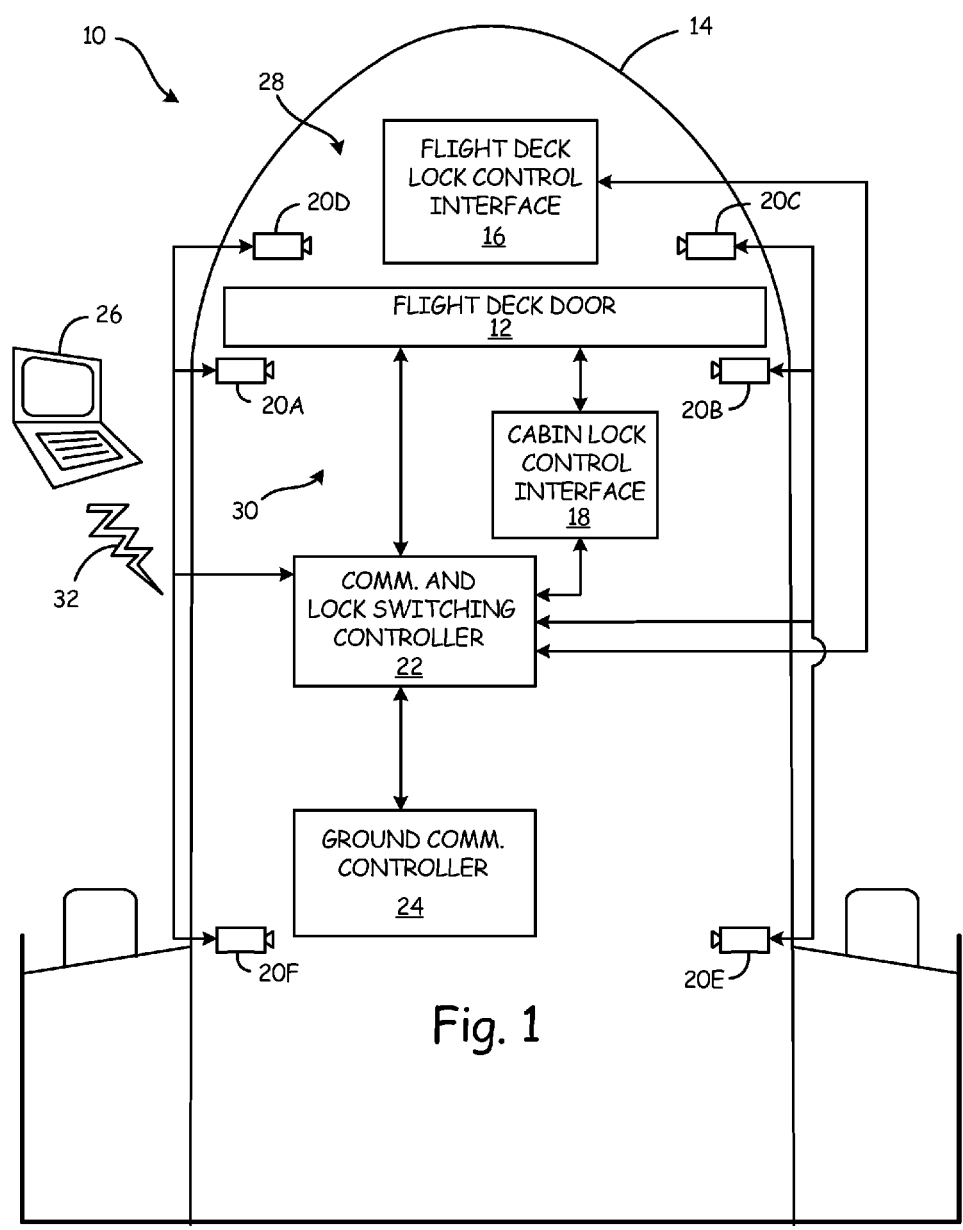
FIG. 1 is a schematic block diagram of an example lock control system that can be used to control actuation of an electronically-controlled door lock of a flight deck door of an aircraft.

According to techniques of this disclosure, a lock control system can provide locking override authority of an electronically-controlled flight deck door lock of an aircraft to a ground-based computing device of, e.g., a ground control station. That is, rather than place ultimate authority to control the electronically-controlled flight deck door lock with an interface (e.g., a switch or other interface) located within the aircraft (e.g., the flight deck of the aircraft), a system implementing techniques of this disclosure can place override authority to unlock the flight deck door with a remote ground-based computing device, such as a control terminal of a ground control station. The system can automatically transmit image data of the interior of the aircraft (e.g., video data, still image data, or other types of image data of the cabin and/or flight deck of the aircraft), sound data, or both to the ground-based computing device in response to determining that one or more locking override criteria are satisfied. Example locking override criteria can include activation of an unlock override control mechanism located within, e.g., the flight deck (which protocol may specify is only to be activated during times of duress), a threshold number of unsuccessful unlock attempts of the flight deck door lock (e.g., using a keypad or other unlocking mechanism), a threshold number of unlock requests (e.g., via an entry request button or other notification system) without the flight deck door being unlocked, a threshold sound level exceeded within the cabin and/or flight deck of the aircraft, or other locking override criteria.

Ground control or other personnel can review the received video data (and/or sound data) to determine whether to provide a lock override command to unlock the locking mechanism of the flight deck door. In situations where ground control determines that the lock override command is warranted (e.g., times of duress), the remote ground-based computing device can transmit a lock override command to override any locking command and cause the electronically-controlled door lock of the flight deck door to actuate to an unlocked position. In this way, ultimate authority of the position (e.g., lock and/or unlock position) of the flight deck door lock can be controlled via a ground-based computing device that is remote from the aircraft, thereby increasing safety of the passengers and crew of the aircraft by helping to minimize a risk that unauthorized or possibly ill-intentioned persons could lock themselves within the flight deck of the aircraft. Moreover, automatic transmission of the video and/or sound data during appropriate times (e.g., in response to satisfaction of the one or more alert criteria) can help to reduce (or eliminate) the need for access to or knowledge of a "panic switch" or other manual activation mechanism by the flight crew, thereby increasing efficiency of operation of the system (e.g., by decreasing workload of the flight crew) and further increasing safety of the aircraft, flight crew, and passengers in general.

FIG. 1 is a schematic block diagram illustrating one example of lock control system 10 that can be used to control actuation of an electronically-controlled door lock of flight deck door 12 of aircraft 14. As illustrated in FIG. 1, lock control system 10 can include flight deck door 12, flight deck lock control interface 16, cabin lock control interface 18, cameras 20A, 20B, 20C, 20D, 20E, and 20F (collectively referred to herein as "cameras 20"), communication and lock switching controller 22, ground communication controller 24, and remote computing device 26. Flight deck door 12 separates flight deck area (or "flight deck") 28 from cabin area (or "cabin") 30. Flight deck 28 includes flight controls and other instrumentation for piloting aircraft 14. Cabin 30, as discussed herein, includes those areas of aircraft 14 in which flight crew (e.g., pilots, copilots, flight attendants, or other flight crew) and passengers can access but are separate from flight deck 28, including, e.g., an aircraft galley area, passenger seating area, and other areas separated from flight deck 28 by flight deck door 12. Flight deck door 12, in this example, includes an electronically-controlled door lock that can be actuated between a locked and unlocked position to control the opening and closing of flight deck door 12.

As illustrated in FIG. 1, flight deck lock control interface 16 can be positioned within flight deck 28. Flight deck lock control interface 16 can be, for example, a switch, a button, a graphical interface included with, e.g., an electronic flight instrument system (EFIS), a voice activated interface, or another lock control interface electronically and/or communicatively connected to control actuation of the electronically-controlled door lock of flight deck door 12. For instance, flight deck lock control interface 16 can be a switch disposed within flight deck 28 that can be selectively positioned between a lock position, an unlock position, and an unlock override position, as is further described below.

Cabin lock control interface 18 can be any lock control interface positioned within cabin 30 and electrically and/or communicatively coupled to control actuation of the electronically-controlled door lock of flight deck door 12. For example, cabin lock control interface 18 can include a keypad (e.g., a numeric keypad, an alphanumeric keypad, or another keypad interface) configured to receive an entrance code (e.g., from a user) for selectively actuating the electronically-controlled door lock between a locked position and an unlocked position in response to receiving a candidate entrance code that matches an unlock code. In certain examples, cabin lock interface 18 can include a voice-recognition, fingerprint recognition, retinal scan recognition, facial recognition, or other biometric interface for selectively controlling activation of the electronically-controlled door lock of flight deck door 12. In some examples, cabin lock interface 18 can include an entry request button or other notification system to output an unlock request notification to notify personnel within flight deck 28 of a request to unlock flight deck door 12. For instance, activation of the entry request button or other notification system via cabin lock control interface 18 can prompt flight crew or other personnel within flight deck 28 to view image data captured by one or more of cameras 20A and 20B and displayed at a display device within flight deck 28, such as a display included with an EFIS of flight deck 28. Personnel within flight deck 28 can utilize the displayed image data to verify whether the person(s) requesting access to flight deck 28 is trusted and/or authorized to enter flight deck 28.

Cameras 20 can include a plurality of cameras positioned within flight deck 28 and/or cabin 30. For instance, as in the example of FIG. 1, cameras 20 can include cameras 20A and 20B positioned within cabin 30 to capture image data of an interior of cabin 28. Cameras 20A and 20B, as illustrated, can be positioned to include a field of view of an area of cabin 30 proximate flight deck door 12, such as an area extending from flight deck door 12 to within five feet, ten feet, or other distances from flight deck door 12. Cameras 20A and 20B can, in certain examples, be considered as a flight deck entry video surveillance system (FDEVSS) or cockpit door surveillance system (CDSS). In this way, cameras 20A and 20B can be configured to capture image data of a region proximate flight deck door 12 that may include persons exiting, entering, requesting access to, or attempting access to flight deck 28 through flight deck door 12.

Cameras 20 can further include cameras 20C and 20D positioned within flight deck 28 to include a field of view of an interior of flight deck 28. Cameras 20E and 20F, positioned within cabin 30 to include a field of view of a passenger area of cabin 30 can, in certain examples, be considered a cabin video monitoring system (CVMS). While illustrated in the example of FIG. 1 as including six cameras 20 (i.e., cameras 20A, 20B, 20C, 20D, 20E, and 20F), in other examples, cameras 20 can include more or fewer than six cameras. Similarly, cameras 20, in certain examples, need not be positioned to capture image data from each of flight deck 28 and cabin 30. For instance, cameras 20 can, in some examples, include one or more cameras positioned to capture image data within cabin 30 without including cameras positioned to capture image data within flight deck 28. In other examples, cameras 20 can include one or more cameras positioned to capture image data within flight deck 28 without including cameras positioned to capture image data within cabin 30.

Cameras 20 can be and/or include any image capturing sensor and/or device configured to capture (e.g., sense) image data (e.g., video and/or still image data) in digital and/or analog form. In certain examples, any one or more of cameras 20 can include a microphone and/or speaker device configured to capture and/or transmit sound data. In some examples, cameras 20 can be part of an integrated flight deck and/or cabin surveillance system configured to retrieve and/or store image data of one or more portions of an interior and/or exterior of aircraft 14. Any one or more of cameras 20 can store a threshold amount of image data within a data buffer, such as a circular (or ring) buffer (e.g., a first-in-first-out (FIFO) buffer) that stores a threshold amount of image data corresponding to a threshold time period, such as a thirty seconds, five minutes, thirty minutes, or other threshold time periods. In certain examples, the data buffer can be stored at computer-readable memory of communication and lock switching controller 22.

Communication and lock switching controller 22 can include one or more processors and computer-readable storage devices encoded with instructions that, when executed by the one or more processors, cause communication and lock switching controller 22 to implement functionality according to techniques described herein. For instance, communication and lock switching 22 can be a processing device positioned within, e.g., cabin 30, an electronics bay, or other area of aircraft 14 and electrically and/or communicatively coupled with one or more of cameras 20, cabin lock control interface 18, flight deck lock control interface 16, the electronically-controlled lock of flight deck door 12, and ground communication controller 24 to output image data received from cameras 20 for transmission to remote computing device 26 in response to determining that one or more alert criteria are satisfied, as is further described below. Examples of one or more processors of communication and lock switching controller 22 can include any one or more of a microprocessor, a controller, a digital signal processor (DSP), an application specific integrated circuit (ASIC), a field-programmable gate array (FPGA), or other equivalent discrete or integrated logic circuitry.

One or more storage devices of communication and lock switching controller 22 can be configured to store information within communication and lock switching controller 22 during operation. Such storage devices, in some examples, are described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g. in RAM or cache). In some examples, the storage devices are a temporary memory, meaning that a primary purpose of the storage devices is not long-term storage. The storage devices, in some examples, are described as a volatile memory, meaning that the storage devices do not maintain stored contents when power to communication and lock switching controller is turned off. Examples of volatile memories can include random access memories (RAM), dynamic random access memories (DRAM), static random access memories (SRAM), and other forms of volatile memories. In some examples, the storage devices are used to store program instructions for execution by the one or more processors of communication and lock switching controller 22. The storage devices, in certain examples, are used by software or applications running on communication and lock switching controller 22 to temporarily store information during program execution.

Storage devices of communication and lock switching controller 22, in some examples, can be configured to store larger amounts of information than volatile memory. Storage devices can further be configured for long-term storage of information. In some examples, the storage devices include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

Communication and lock switching controller 22, as illustrated in FIG. 1, is electrically and/or communicatively coupled to ground communication controller 24. Ground communication controller 24 can be any processing device including processing circuitry and computer-readable memory configured to transmit and/or receive data via one or more wireless communication networks, such as wireless communication network 32. For instance, ground communication controller 24 can include and/or be operatively coupled to a wireless transceiver (e.g., antenna) for transmitting and receiving data via wireless communication network 32 with remote computing device 26. Remote computing device 26 can be any processing device including processing circuitry and computer-readable memory to receive video and/or sound data, output such video and/or sound data for user review, and selectively transmit a lock override command via wireless communication network 32. Examples of remote computing device 26 include, but are not limited to, desktop computers, laptop computers, tablet computers, servers, mainframes, mobile phones (including smartphones), personal digital assistants (PDAs), or other computing devices. In some examples, remote computing device 26 can be a ground control terminal device at a ground control station configured for wireless communications with one or more aircraft, such as aircraft 14.

Wireless communication network 32 can include, e.g., any one or more of a satellite communications (SATCOM) network, a cellular communications network, a wireless internet (e.g., WiFi) communications network, a radio frequency (RF) communications network, or other types of wireless communication networks. In general, wireless communication network 32 can be any wireless communication network that enables ground communication controller 24 to send and receive data with a remote computing device, such as remote computing device 26.

In operation, communication and lock switching controller 22 outputs image data (e.g., video image data, still image data, or other types of image data) and/or sound data captured by any one or more of cameras 20 to ground communication controller 24 for transmission to remote computing device 26 in response to determining that one or more alert criteria are satisfied. Ground control or other personnel can review the received image and/or sound data to determine whether to transmit a lock override command configured to cause communication and lock switching controller 22 to actuate the electronically-controlled door lock of flight deck door 12 to an unlock position. In some examples, remote computing device 26 can include a microphone and speaker device to enable one-way and/or two-way audio communication between ground control personnel and, e.g., flight crew or other persons attempting entry to flight deck 28 via cabin lock control interface 18.

For instance, as one example of operation of lock control system 10, the electronically-controlled door lock of flight deck door 12 can be actuated to a lock position during flight, thereby preventing the opening of flight deck door 12 and the corresponding access of persons between flight deck 28 and cabin 30. Accordingly, access from cabin 30 to flight deck 28 while flight deck door 12 is locked can be achieved via cabin lock control interface 18. For instance, cabin lock control interface 18 can include an entry request button or other access request system that can enable a person, such as a member of the flight crew that has left flight deck 28 during flight, to notify flight crew remaining within flight deck 28 that access to flight deck 28 is requested. In response to receiving the access request notification, flight crew within flight deck 28 can view (or be automatically prompted with) video data of an area within cabin 20 proximate flight deck door 12 (and, e.g., cabin lock control interface 18) captured by one or more of cameras 20A and 20B. Flight crew within flight deck 28, upon determining that person(s) requesting access to flight deck 28 are authorized for entry, can actuate the electronically-controlled door lock of flight deck door 12 to an unlock position via, e.g., flight deck lock control interface 16, thereby enabling access to flight deck 28 through flight deck door 12. Alternatively, upon determining that person(s) requesting access to flight deck 28 are not authorized for entry, flight crew within flight deck 28 can deny access to flight deck 28 through flight deck door 12 by refusing to actuate the electronically-controlled door lock of flight deck door 12 via flight deck lock control interface 16. As such, unauthorized persons can be denied access to flight deck 28 (e.g., during flight), thereby helping to ensure safe operation of aircraft 14.

In certain examples, to help mitigate a potential risk that no flight crew remains within flight deck 28 or that the remaining flight crew is incapacitated or otherwise unresponsive, actuation of the electronically-controlled door lock of flight deck door 12 can be controlled via entry of a passcode on a keypad or other interface of cabin lock control interface 18. That is, receipt of a candidate passcode by cabin lock control interface 18 that matches an unlock passcode can cause actuation of the electronically-controlled door lock of flight deck door 12 to an unlocked position, thereby enabling access to flight deck 28 through flight deck door 12. Such passcodes can typically be communicated only to authorized personnel (e.g., a pilot, copilot, flight attendants, or other authorized personnel), and may typically be modified between flights to help prevent knowledge of the passcode by unauthorized persons. Nevertheless, to help mitigate potential risks that the passcode could become known by unauthorized persons or that an authorized person could enter the passcode under duress, flight deck lock control interface 16 can include an unlock override mechanism that can override the unlock command provided by cabin lock control interface 18. For example, flight deck lock control interface 16 can include a toggle switch or other interface that can selectively activate an unlock override mechanism to maintain the electronically-controlled door lock of flight deck door 12 in a locked position even when a candidate passcode that matches an unlock passcode has been received by cabin lock control interface 18. In this way, the activated unlock override mechanism (e.g., activated via flight deck lock control interface 16) can effectively take priority over an unlock command provided by cabin lock control interface 18 to prevent unlocking of the electronically-controlled door lock and access to flight deck 28 through flight deck door 12.

Remote computing device 26 can transmit a lock override command configured to override a locking command maintaining the electronically-controlled door lock of flight deck door 12 in a locked position. That is, the lock override command can have a higher priority than the unlock override mechanism activated, e.g., via flight deck lock control interface 16. Communication and lock switching controller 22 can receive the lock override command from remote computing device 26 via wireless communication network 32 (e.g., through ground communication controller 24), and can transmit the lock override command to the electronically-controlled door lock (or a controller device of the electronically-controlled door lock) to cause the electronically-controlled door lock to actuate to an unlock position. That is, upon receipt of the lock override command, the electronically-controlled door lock can actuate to an unlock position even while the unlock override mechanism (e.g., activated via flight deck lock control interface 16) is active. In this way, ultimate authority to unlock flight deck door 12 can reside with personnel that is not currently aboard aircraft 14. The lock override command can include, e.g., a communication message having a predefined format and/or command key (e.g., a data key including a predefined combination of bits and/or bytes) for causing the electronically-controlled door lock of flight deck door 12 to actuate to the unlock position, thereby helping to prevent unintentional and/or unauthorized lock override commands. In certain examples, the lock override command and/or communication message can be encrypted, transmitted via a secured network communication channel, or both.

To facilitate determinations by, e.g., ground control personnel to transmit the lock override command from remote computing device 26, communication and lock switching controller 22 can output image and/or sound data captured by one or more of cameras 20 for transmission to remote computing device 26 in response to determining that one or more alert criteria are satisfied. The transmitted image data can include video data and/or still image data captured by one or more of cameras 20. In certain examples, the transmitted image data can include buffered data, such as buffered video data, a starting time of the buffered video data corresponding to a threshold time period prior to determining that the one or more alert criteria are satisfied, such as a threshold time period of thirty seconds, one minute, five minutes, thirty minutes, or other threshold time periods.

Ground control or other personnel can view the image data received by remote computing device 26 to determine whether to transmit the lock override command, such as when the image data indicates distress that may require access to flight deck 28 by one or more persons within cabin 30. In some examples, ground control or other personnel can commence verbal communications with flight crew of other persons via, e.g., speaker and microphone systems of remote computing device 26 and cabin lock control interface 18. In this way, ground control or other personnel can evaluate possibly dangerous situations aboard aircraft 14 to determine whether access to flight deck 28 via flight deck door 12 is warranted.

As described above, communication and lock switching controller 22 can transmit the image and/or sound data captured by one or more of cameras 20 to remote computing device 26 via ground communication controller 24 in response to determining that one or more alert criteria are satisfied. As one example, alert criteria can be satisfied when an unlock override mechanism is active (e.g., a user-activated unlock override mechanism is activated via flight deck lock control interface 16 within flight deck 28). For instance, protocol may specify that such an unlock override mechanism is only to be activated during times of distress, such as when flight crew within flight deck 28 perceives a threat that may compromise the integrity of the locking protocol of flight deck door 12. As such, communication and lock switching controller 22 can determine that activation of the unlock override mechanism satisfies the one or more alert criteria, and can automatically transmit image data to remote computing device 26 in response. In this way, communication and lock switching controller 22 can enable remote personnel to evaluate the situation and determine whether to transmit the lock override command to unlock the electronically-controlled door lock of flight deck door 12.

As another example, communication and lock switching controller 22 can determine that the one or more alert criteria are satisfied in response to determining that a threshold number of unsuccessful unlock attempts of the electronically-controlled door lock of flight deck door 12 have occurred. For instance, communication and lock switching controller 22 can monitor a number of unlock attempts of flight deck door 12 via cabin lock control interface 18, and can determine that the one or more alert criteria are satisfied in response to determining that a threshold number (e.g., one, two, three, or more) of consecutive or non-consecutive unlock requests have been attempted via cabin lock control interface 18 without actuation of the electronically-controlled door lock of flight deck door 12 from a locked position to an unlock position. In some examples, communication and lock switching controller 22 can determine that the one or more alert criteria are satisfied in response to determining that the threshold number of unsuccessful unlock attempts have occurred within a threshold time period, such as one minute, two minutes, five minutes or other threshold time periods.

In certain examples, communication and lock switching controller 22 can determine that the one or more alert criteria are satisfied in response to determining that a threshold number of unlock requests to unlock the flight deck door, such as one, two, three, or more unlock requests via, e.g., an entry request button or other notification system of cabin lock control interface 18, have occurred without the electronically-controlled door lock of flight deck door 12 being unlocked. In some examples, communication and lock switching controller 22 can determine that the one or more alert criteria are satisfied in response to determining that the threshold number of unsuccessful unlock requests have occurred within a threshold period of time, such as one minute, two minutes, five minutes, or other threshold time periods.

In certain examples, communication and lock switching controller 22 can determine that the one or more alert criteria are satisfied in response to a result of facial recognition analytics corresponding to image data received by any one or more of cameras 20 (e.g., cameras 20A and 20B proximate flight deck door 12). For instance, communication and lock switching controller 22 can utilize facial recognition analytics techniques to determine whether facial features within image data received by cameras 20 correspond to an identified person associated with, e.g., a no-fly list or other pre-defined list of facial features data. In this way, communication and lock switching controller 22 can help to identify whether, e.g., a person associated with a pre-defined list is on-board aircraft 10 and/or attempting entry to flight deck 28 via flight deck door 12. In some examples, communication and lock switching controller 22 can determine that the one or more alert criteria are satisfied in response to determining that facial features (sensed, e.g., via cameras 20A and/or 20B) corresponding to a person attempting access to flight deck 28 via flight deck door 12 are not associated with a pre-defined list of facial features data. For instance, communication and lock switching controller 22 can store (or access) a database of facial feature data corresponding to flight crew or other personnel authorized to access flight deck 28. Communication and lock switching controller 22 can determine that the one or more alert criteria are satisfied in response to determining that facial feature data corresponding to a person attempting access to flight deck 28 via cabin lock control interface 18 does not correspond to the facial feature data of the pre-defined list of flight crew or other authorized personnel.

In some examples, communication and lock switching controller 22 can determine that the one or more alert criteria are satisfied in response to determining that a threshold sound level within the interior of aircraft 14 (e.g., within flight deck 28 or cabin 30) is exceeded. For instance, a sound level detected by, for example, a microphone included with one or more of cameras 20 that exceeds a threshold sound level can indicate distress among passengers or flight crew aboard aircraft 14. As such, communication and lock switching controller 22 can transmit image data to remote computing device 26 for evaluation of the situation in response to determining that the threshold sound level is exceeded.

In this way, lock control system 10 can automatically transmit image data, such as video data, to remote computing device 26 for evaluation by ground control or other personnel in response to determining that one or more alert criteria that can indicate a need to unlock flight deck door 12 are satisfied. Accordingly, lock control system 10 can help mitigate a risk that an unauthorized or possibly ill-intentioned person has locked flight deck door 12 from within flight deck 28 and prevented access to flight deck 28 from cabin 30. By automatically transmitting the image data, lock control system 10 can reduce or eliminate the need for access to or knowledge of a "panic switch" or other manual activation mechanism by the flight crew for initiating transmission of the image data. Moreover, in certain situations, lock control system 10 can initiate transmission of the image data for review by ground control even prior to knowledge of a potentially dangerous situation by those flight crew who may potentially manually initiate the image data transfer. For instance, flight crew within cabin 30 may not be aware of the occurrence of an event that can satisfy the one or more alert criteria (such as the activation of the unlock override mechanism from within flight deck 28) until access to flight deck 28 via flight deck door 12 is attempted. By automatically transmitting the image data for review by ground control or other personnel in response to satisfaction of the one or more alert criteria, lock control system 10 can potentially decrease a time for response to a potentially dangerous situation aboard aircraft 14, thereby further increasing system safety.

Figure 2:
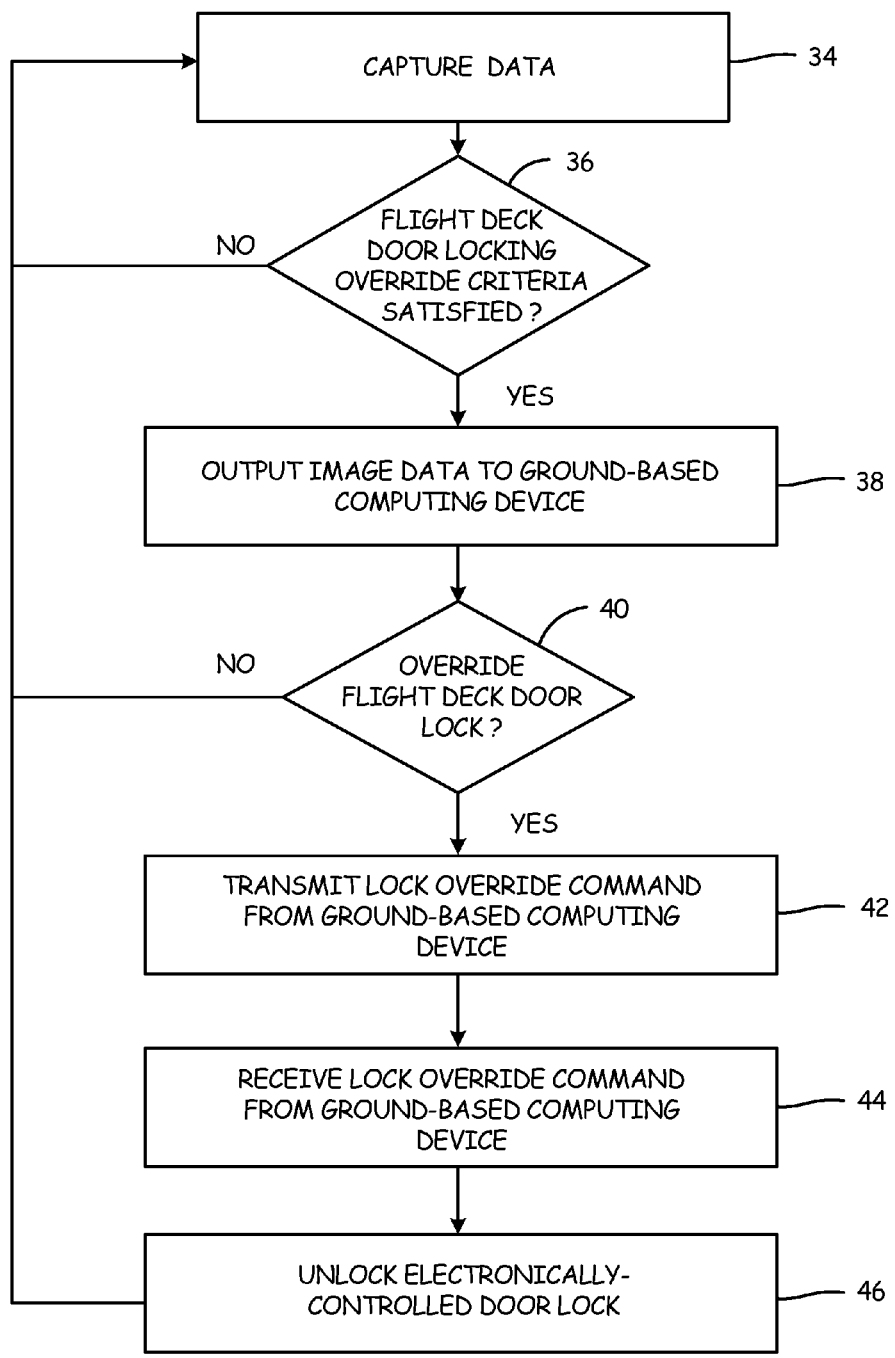
FIG. 2 is a flow diagram illustrating example operations to control actuation of an electronically-controlled door lock of a flight deck door of an aircraft.

FIG. 2 is a flow diagram illustrating example operations to control actuation of an electronically-controlled door lock of a flight deck door of an aircraft. For purposes of clarity and ease of discussion, the example operations are described below within the context of lock control system 10 of FIG. 1.

Image data of an interior of an aircraft can be captured (34). For instance, any one or more of cameras 20 can capture image data of flight deck 28 and/or cabin 30 of aircraft 14. It can be determined whether one or more alert criteria are satisfied (36). For example, communication and lock switching controller 22 can determine whether one or more alert criteria are satisfied. As one example, one or more alert criteria can be satisfied by activation of an unlock override command, such as an unlock override command activated via flight deck lock control interface 16 to override an unlock command of an electronically-controlled door lock of flight deck door 12 provided by cabin lock control interface 18. As another example, one or more alert criteria can be satisfied in response to a threshold number of unsuccessful unlock attempts of the electronically-controlled door lock of flight deck door 12, such as a threshold number of unsuccessful unlock attempts via cabin lock control interface 18. In certain examples, one or more alert criteria can be satisfied in response to a threshold number of unlock requests to unlock flight deck door 12 without the electronically-controlled door lock of flight deck door 12 being actuated to an unlock position. In some examples, one or more alert criteria can be satisfied based on a result of facial recognition analytics techniques corresponding to image data captured by any one or more of cameras 20. In some examples, one or more alert criteria can be satisfied in response to a threshold sound level within the interior of aircraft 14 being exceeded.

In examples where communication and lock switching controller 22 determines that the one or more door locking override criteria are not satisfied ("NO" branch of 36), image data can be continue to be captured. That is, communication and lock switching controller 22 can refrain from transmitting image data via wireless communication network 32 in response to determining that the one or more door locking override criteria are not satisfied, thereby helping to reduce the possibly costly expense of transmitting the image data via wireless communication network 32. In examples where communication and lock switching controller 22 determines that one or more door locking override criteria are satisfied ("YES" branch of 36), at least a portion of the captured image data can be output for transmission to a remote computing device (38). For instance, communication and lock switching controller 22 can output at least a portion of the image data captured by any one or more of cameras 20 for transmission via ground communication controller 24 to remote computing device 26, which can be a ground-based computing device included at, e.g., a ground control station.

It can be determined whether to override a door locking command configured to lock the electronically-controlled door lock of the flight deck (40). For example, ground control or other personnel can view the received image data of the interior of aircraft 14, and can determine whether the image data indicates a situation warranting a command to override the locking command (e.g., a situation of distress) maintaining the actuation of the electronically-controlled door lock in a locked position. In examples where it is determined that the door locking command should not be overridden ("NO" branch of 40), remote computing device 26 can refrain from transmitting the lock override command and image data can continue to be captured.

In examples where it is determined that the door locking command should be overridden ("YES" branch of 40), remote computing device 26 can transmit a lock override command configured to cause the electronically-controlled door lock of flight deck door 12 to be unlocked (42). The lock override command can be received from the remote computing device (44). For instance, communication and lock switching controller 22 can receive the lock override command from remote computing device 26 via ground communication controller 24.

The electronically-controlled door lock of the flight deck door can be unlocked in response to receiving the lock override command (46). For example, communication and lock switching controller 22 can cause the electronically-controlled door lock of flight deck door 12 to actuate to an unlock position in response to receiving the lock override command.

Accordingly, techniques of this disclosure can increase safety of passengers and flight crew aboard an aircraft by enabling the flight deck door of the aircraft to be unlocked via an unlock command provided by a remote (e.g., ground-based) computing device. Automatic transmission of image data of the interior of the aircraft in response to determining that one or more alert criteria can help to increase system efficiency and safety by reducing user-based dependencies for system activation and possibly reducing overall response time to unlock the flight deck door.

The following are non-exclusive descriptions of possible embodiments of the present invention.

A method includes capturing, by a camera system including at least one camera device positioned within an aircraft, image data of an interior of the aircraft. The method further includes determining, by a processing device positioned within the aircraft, that one or more alert criteria are satisfied, and outputting, by the processing device in response to determining that the one or more alert criteria are satisfied, at least a portion of the captured image data of the interior of the aircraft for transmission to a ground-based computing device via a wireless communications network. The method further includes receiving, by the processing device from the ground-based computing device via the wireless communications network, a lock override command configured to cause the processing device to unlock an electronically-controlled door lock of a flight deck door of the aircraft, and unlocking, by the processing device in response to receiving the lock override command from the ground-based computing device, the electronically-controlled door lock of the flight deck door.

The method of the preceding paragraph can optionally include, additionally and/or alternatively, any one or more of the following features, configurations, operations and/or additional components:

Unlocking the electronically-controlled door lock of the flight deck door can override a locking command configured to lock the electronically-controlled door lock of the flight deck door.

Determining that the one or more alert criteria are satisfied can include determining that a user-activated unlock override command is active.

The user-activated unlock override command can be activated via an interface located within a flight deck of the aircraft.

Determining that the one or more alert criteria are satisfied can include determining that a threshold number of unsuccessful unlock attempts of the electronically-controlled door lock of the flight deck door have occurred.

Determining that the one or more alert criteria are satisfied can include determining that a threshold number of unlock requests to unlock the flight deck door have occurred without the electronically-controlled door lock of a flight deck door of the aircraft being unlocked.

Determining that the one or more alert criteria are satisfied can include determining that a threshold sound level within the interior of the aircraft is exceeded.

Determining that the one or more alert criteria are satisfied can include determining that facial feature data included in the captured image data does not correspond to a pre-defined set of facial feature data.

Determining that the one or more alert criteria are satisfied can include determining that facial feature data included in the captured image data corresponds to at least one pre-defined set of facial feature data.

Outputting the at least one portion of the captured image data can include outputting buffered video data of the interior of the aircraft. A starting time of the buffered video data can correspond to a threshold time period prior to determining that the one or more alert criteria are satisfied.

The at least one camera device can include at least one cabin camera device with a field of view of an area within a cabin of the aircraft proximate the flight deck door. Outputting the at least one portion of the captured image data can include outputting at least the captured image data of the at least one cabin camera device.

The at least one camera device can include at least one flight deck camera device with a field of view of an interior of a flight deck of the aircraft. Outputting the at least one portion of the captured image data can include outputting at least the captured image data of the at least one flight deck camera device.

Outputting the at least one portion of the captured image data of the interior of the aircraft for transmission to the ground-based computing device via the wireless communications network can include outputting the one or more portions of the captured image data of the interior of the aircraft for transmission to the ground-based computing device via a satellite communications (SATCOM) network. Receiving, by the processing device from the ground-based computing device via the wireless communications network, the lock override command can include receiving, by the processing device via the SATCOM network, the lock override command.

A system includes a camera system including at least one camera device and a processing device positioned within an aircraft. The camera system is configured to capture image data of an interior of the aircraft. The processing device comprises at least one processor and one or more storage devices. The one or more storage devices are encoded with instructions that, when executed by the at least one processor, cause the processing device to determine that one or more alert criteria are satisfied, and output, in response to determining that the one or more alert criteria are satisfied, at least a portion of image data of the interior of the aircraft captured by the camera system for transmission to a ground-based computing device via a wireless communications network. The one or more storage devices are further encoded with instructions that, when executed by the at least one processor, cause the processing device to receive, from the ground-based computing device via the wireless communications network, a lock override command configured to cause the processing device to unlock an electronically-controlled door lock of a flight deck door of the aircraft, and unlock, in response to receiving the lock override command from the ground-based computing device, the electronically-controlled door lock of the flight deck door.

The system of the preceding paragraph can optionally include, additionally and/or alternatively, any one or more of the following features, configurations, operations and/or additional components:

The instructions that, when executed by the at least one processor, cause the processing device to unlock the electronically-controlled door lock of the flight deck door can include instructions that, when executed by the at least one processor, cause the processing device to override a locking command configured to lock the electronically-controlled door lock of the flight deck door.

The instructions that, when executed by the at least one processor, cause the processing device to determine that the one or more alert criteria are satisfied can include instructions that, when executed by the at least one processor, cause the processing device to determine that a user-activated unlock override command is activated via an interface located within a flight deck of the aircraft.

The instructions that, when executed by the at least one processor, cause the processing device to determine that the one or more alert criteria are satisfied can include instructions that, when executed by the at least one processor, cause the processing device to determine that a threshold number of unsuccessful unlock attempts of the electronically-controlled door lock of the flight deck door have occurred.

The instructions that, when executed by the at least one processor, cause the processing device to determine that the one or more alert criteria are satisfied can include instructions that, when executed by the at least one processor, cause the processing device to determine that a threshold number of unlock requests to unlock the flight deck door have occurred without the electronically-controlled door lock of a flight deck door of the aircraft being unlocked.

The system can further include a microphone configured to sense sound within the interior of the aircraft. The instructions that, when executed by the at least one processor, cause the processing device to determine that the one or more alert criteria are satisfied can include instructions that, when executed by the at least one processor, cause the processing device to determine that a threshold sound level of sound within the interior of the aircraft sensed by the microphone is exceeded.

The instructions that, when executed by the at least one processor, cause the processing device to output the at least one portion of the captured image data can include instructions that, when executed by the at least one processor, cause the processing device to output buffered video data of the interior of the aircraft. A starting time of the buffered video data can correspond to a threshold time period prior to determining that the one or more alert criteria are satisfied.

The at least one camera device can include at least one cabin camera device with a field of view of an area within a cabin of the aircraft proximate the flight deck door. The instructions that, when executed by the at least one processor, cause the processing device to output the at least one portion of the image data can include instructions that, when executed by the at least one processor, cause the processing device to output at least the captured image data of the at least one cabin camera device.

The at least one camera device can include at least one cabin camera device with a field of view that includes an area within a cabin of the aircraft proximate the flight deck door. The instructions that, when executed by the at least one processor, cause the processing device to determine that the one or more alert criteria are satisfied can include instructions that, when executed by the at least one processor, cause the processing device to determine that facial feature data captured by the cabin camera device is either included in a pre-defined set of facial feature data corresponding to unauthorized persons or is not included in a pre-defined set of facial feature data corresponding to authorized personnel.

The at least one camera device can include at least one flight deck camera device with a field of view of an interior of a flight deck of the aircraft. The instructions that, when executed by the at least one processor, cause the processing device to output the at least one portion of the captured image data can include instructions that, when executed by the at least one processor, cause the processing device to output at least the captured image data of the at least one flight deck camera device.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. A method comprising:
   capturing, by a camera system including at least one camera device positioned within an aircraft, image data of an interior of the aircraft;
   determining, by a processing device positioned within the aircraft, that one or more alert criteria are satisfied;
   outputting, by the processing device in response to determining that the one or more alert criteria are satisfied, at least a portion of the captured image data of the interior of the aircraft for transmission to a ground-based computing device via a wireless communications network;
   receiving, by the processing device from the ground-based computing device via the wireless communications network, a lock override command configured to cause the processing device to unlock an electronically-controlled door lock of a flight deck door of the aircraft; and
   unlocking, by the processing device in response to receiving the lock override command from the ground-based computing device, the electronically-controlled door lock of the flight deck door;
   wherein determining that the one or more alert criteria are satisfied comprises determining that a user-activated unlock override command is active; and
   wherein the user-activated unlock override command is activated via an interface located within a flight deck of the aircraft.

2. The method of claim 1, wherein unlocking the electronically-controlled door lock of the flight deck door overrides a locking command configured to lock the electronically-controlled door lock of the flight deck door.

3. The method of claim 1, wherein determining that the one or more alert criteria are satisfied comprises determining that a threshold number of unsuccessful unlock attempts of the electronically-controlled door lock of the flight deck door have occurred.

4. The method of claim 1, wherein determining that the one or more alert criteria are satisfied comprises determining that a threshold number of unlock requests to unlock the flight deck door have occurred without the electronically-controlled door lock of a flight deck door of the aircraft being unlocked.

5. The method of claim 1, wherein determining that the one or more alert criteria are satisfied comprises determining that a threshold sound level within the interior of the aircraft is exceeded.

6. The method of claim 1, wherein determining that the one or more alert criteria are satisfied comprises determining that facial feature data included in the captured image data does not correspond to a pre-defined set of facial feature data.

7. The method of claim 1, wherein determining that the one or more alert criteria are satisfied comprises determining that facial feature data included in the captured image data corresponds to at least one pre-defined set of facial feature data.

8. The method of claim 1, wherein outputting the at least one portion of the captured image data comprises outputting buffered video data of the interior of the aircraft, a starting time of the buffered video data corresponding to a threshold time period prior to determining that the one or more alert criteria are satisfied.

9. The method of claim 1,
   wherein the at least one camera device includes at least one cabin camera device positioned with a field of view that includes an area within a cabin of the aircraft proximate the flight deck door; and
   wherein outputting the at least one portion of the captured image data comprises outputting at least the captured image data of the at least one cabin camera device.

10. The method of claim 1,
    wherein the at least one camera device includes at least one flight deck camera device positioned with a field of view that includes an interior of a flight deck of the aircraft; and
    wherein outputting the at least one portion of the captured image data comprises outputting the at least one portion of the captured image data of the at least one flight deck camera device.

11. A system comprising:
    a camera system including at least one camera device positioned within an aircraft and configured to capture image data of an interior of the aircraft; and
    a processing device positioned within the aircraft, the processing device comprising at least one processor and one or more storage devices, the one or more storage devices encoded with instructions that, when executed by the at least one processor, cause the at least one processor to:
      determine that one or more alert criteria are satisfied;
      output, in response to determining that the one or more alert criteria are satisfied, at least a portion of the image data of the interior of the aircraft captured by the camera system for transmission to a ground-based computing device via a wireless communications network;
      receive, from the ground-based computing device via the wireless communications network, a lock override command configured to cause the processing device to unlock an electronically-controlled door lock of a flight deck door of the aircraft; and
      unlock, in response to receiving the lock override command from the ground-based computing device, the electronically-controlled door lock of the flight deck door;
    wherein the instructions that, when executed by the at least one processor, cause the processing device to determine that the one or more alert criteria are satisfied comprise instructions that, when executed by the at least one processor, cause the processing device to determine that a user-activated unlock override command is activated via an interface located within a flight deck of the aircraft.

12. The system of claim 11, wherein the instructions that, when executed by the at least one processor, cause the processing device to unlock the electronically-controlled door lock of the flight deck door comprise instructions that, when executed by the at least one processor, cause the processing device to override a locking command configured to lock the electronically-controlled door lock of the flight deck door.

13. The system of claim 11, wherein the instructions that, when executed by the at least one processor, cause the processing device to determine that the one or more alert criteria are satisfied comprise instructions that, when executed by the at least one processor, cause the processing device to determine that a threshold number of unsuccessful unlock attempts of the electronically-controlled door lock of the flight deck door have occurred.

14. The system of claim 11, wherein the instructions that, when executed by the at least one processor, cause the processing device to determine that the one or more alert criteria are satisfied comprise instructions that, when executed by the at least one processor, cause the processing device to determine that a threshold number of unlock requests to unlock the flight deck door have occurred without the electronically-controlled door lock of a flight deck door of the aircraft being unlocked.

15. The system of claim 11, further comprising:
a microphone configured to sense sound within the interior of the aircraft;
wherein the instructions that, when executed by the at least one processor, cause the processing device to determine that the one or more alert criteria are satisfied comprise instructions that, when executed by the at least one processor, cause the processing device to determine that a threshold sound level of sound within the interior of the aircraft sensed by the microphone is exceeded.

16. The system of claim 11,
wherein the at least one camera device includes at least one cabin camera device with a field of view that includes an area within a cabin of the aircraft proximate the flight deck door;
wherein the instructions that, when executed by the at least one processor, cause the processing device to determine that the one or more alert criteria are satisfied comprise instructions that, when executed by the at least one processor, cause the processing device to determine that facial feature data captured by the cabin camera device is either included in a pre-defined set of facial feature data corresponding to unauthorized persons or is not included in a pre-defined set of facial feature data corresponding to authorized personnel.

17. The system of claim 11,
wherein the at least one camera device includes at least one flight deck camera device with a field of view that includes an interior of a flight deck of the aircraft; and
wherein the instructions that, when executed by the at least one processor, cause the processing device to output the at least one portion of the captured image data comprise instructions that, when executed by the at least one processor, cause the processing device to output at least the captured image data of the at least one flight deck camera device.

* * * * *